(12) United States Patent
Miura

(10) Patent No.: US 9,664,503 B2
(45) Date of Patent: May 30, 2017

(54) SIDE EDGE DETECTION DEVICE WITH MULTICOLORED LIGHT DETECTION UNIT, IMAGE FORMING APPARATUS PROVIDED WITH THE SIDE EDGE DETECTION DEVICE, SIDE EDGE DETECTION METHOD USING MULTICOLORED LIGHT DETECTION UNIT AND STORAGE MEDIUM THEREOF

(71) Applicant: Shogo Miura, Kanagawa (JP)

(72) Inventor: Shogo Miura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/716,815

(22) Filed: May 19, 2015

(65) Prior Publication Data

US 2015/0338812 A1 Nov. 26, 2015

(30) Foreign Application Priority Data

May 23, 2014 (JP) ................................. 2014-106777

(51) Int. Cl.
*G01B 11/04* (2006.01)
*G03G 15/23* (2006.01)

(52) U.S. Cl.
CPC ......... *G01B 11/046* (2013.01); *G03G 15/234* (2013.01); *B65H 2553/416* (2013.01); *G03G 2215/00586* (2013.01); *G03G 2215/00599* (2013.01); *G03G 2215/00616* (2013.01); *G03G 2215/00721* (2013.01)

(58) Field of Classification Search
CPC .............. G01B 11/046; B65H 23/0216; B65H 2553/414; B65H 2553/416; B65H 2553/822; B65H 2557/61; G03G 2215/00616; G03G 2215/00721
See application file for complete search history.

(56) References Cited

U.S. PATENT DOCUMENTS

| 7,202,492 | B2 * | 4/2007 | Inhelder | B65H 23/0216 |
| | | | | 250/559.4 |
| 7,675,051 | B2 * | 3/2010 | Ohta | B65H 7/14 |
| | | | | 250/205 |
| 7,894,764 | B2 * | 2/2011 | Yamauchi | B65H 7/14 |
| | | | | 271/226 |

FOREIGN PATENT DOCUMENTS

JP 2007-119135 5/2007

* cited by examiner

*Primary Examiner* — Justin Olamit
(74) *Attorney, Agent, or Firm* — Duft Bornsen & Fettig, LLP

(57) ABSTRACT

An end position detection device includes a light emission unit including plural light sources for plural colors, respectively, each of the light sources being configured to emit line-like light of one of the colors which is long in a width direction to a conveyance object, the width direction being orthogonal to a conveyance direction of the conveyance object; a light reception unit including plural light reception elements, each configured to receive reflected light from the conveyance object and output a signal corresponding to a received amount of light, arranged in an array in the width direction; and a detection unit configured to detect an end position in the width direction of the conveyance object based on the signals output from the light reception elements in a case where the light sources for the respective colors simultaneously emit light to the conveyance object.

11 Claims, 9 Drawing Sheets

| KIND OF PAPER | LIGHT AMOUNT OF R [mA] | LIGHT AMOUNT OF G [mA] | LIGHT AMOUNT OF B [mA] |
|---|---|---|---|
| PAPER A | 50 | 15 | 10 |
| PAPER B | 20 | 30 | 25 |
| PAPER C | 5 | 10 | 60 |

SIDE EDGE DETECTION DEVICE WITH MULTICOLORED LIGHT DETECTION UNIT, IMAGE FORMING APPARATUS PROVIDED WITH THE SIDE EDGE DETECTION DEVICE, SIDE EDGE DETECTION METHOD USING MULTICOLORED LIGHT DETECTION UNIT AND STORAGE MEDIUM THEREOF

CROSS-REFERENCE TO RELATED APPLICATIONS

The present application is based on and claims the benefit of priority of Japanese Priority Application No. 2014-106777 filed on May 23, 2014, the entire contents of which are hereby incorporated by reference.

BACKGROUND OF THE INVENTION

1. Field of the Invention

The disclosures herein generally relate to an end position detection device, an image forming apparatus, an end position detection method and a storage medium.

2. Description of the Related Art

Conventionally, in image forming apparatuses for forming images on conveyed papers, shifts in positions for forming images on the papers may occur due to dispersion in positions for conveying papers.

For the above problem, for example, an image forming apparatus that prevents a shift in an image position by detecting an end position in a width direction of a conveyed paper and adjusting an image formation position according to a result of detection has been known.

SUMMARY OF THE INVENTION

It is a general object of at least one embodiment of the present invention to provide an end position detection device, an image forming apparatus, an end position detection method and a storage medium that substantially obviate one or more problems caused by the limitations and disadvantages of the related art.

In one embodiment, an end position detection device includes a light emission unit including a plurality of light sources for a plurality of colors, respectively, each of the light sources being configured to emit line-like light of one of the colors which is long in a width direction to a conveyance object, the width direction being orthogonal to a conveyance direction of the conveyance object; a light reception unit including a plurality of light reception elements, each configured to receive reflected light from the conveyance object and output a signal corresponding to a received amount of light, the light reception elements being arranged in an array in the width direction; and a detection unit configured to detect an end position in the width direction of the conveyance object based on the signals output from the light reception elements in a case where the light sources for the respective colors simultaneously emit light to the conveyance object.

In another embodiment, an image forming apparatus comprising an end position detection device, which includes a light emission unit including a plurality of light sources for a plurality of colors, respectively, each of the light sources being configured to emit line-like light of one of the colors which is long in a width direction to a conveyance object, the width direction being orthogonal to a conveyance direction of the conveyance object; a light reception unit including a plurality of light reception elements, each configured to receive reflected light from the conveyance object and output a signal corresponding to a received amount of light, the light reception elements being arranged in an array in the width direction; and a detection unit configured to detect an end position in the width direction of the conveyance object based on the signals output from the light reception elements in a case where the light sources for the respective colors simultaneously emit light to the conveyance object.

In yet another embodiment, an end position detection method includes emitting line-like light of a plurality of colors to a conveyance object from a plurality of light sources for the plurality of colors, respectively, the line-like light being long in a width direction orthogonal to a conveyance direction of the conveyance object; receiving reflected light from the conveyance object and outputting a signal corresponding to a received amount of light at each of a plurality of light reception elements, which are arranged in an array in the width direction; and detecting an end position in the width direction of the conveyance object based on the signals output from the light reception elements in a case where the light sources for the respective colors simultaneously emit light to the conveyance object.

In still another embodiment, a non-transitory computer-readable storage medium stores a program for causing an end position detection device to execute a process of detecting an end position of a conveyance object. The process includes an emission step of emitting line-like light of a plurality of colors to the conveyance object from a plurality of light sources for the plurality of colors, respectively, the line-like light being long in a width direction orthogonal to a conveyance direction of the conveyance object; a reception step of receiving reflected light from the conveyance object and outputting a signal corresponding to a received amount of light at each of a plurality of light reception elements, which are arranged in an array in the width direction; and a detection step of detecting the end position in the width direction of the conveyance object based on the signals output from the light reception elements in a case where the light sources for the respective colors simultaneously emit light to the conveyance object.

According to the embodiment of the present application, end positions in the width direction of a variety of conveyance objects can be detected with a high degree of accuracy.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

Figure 1:
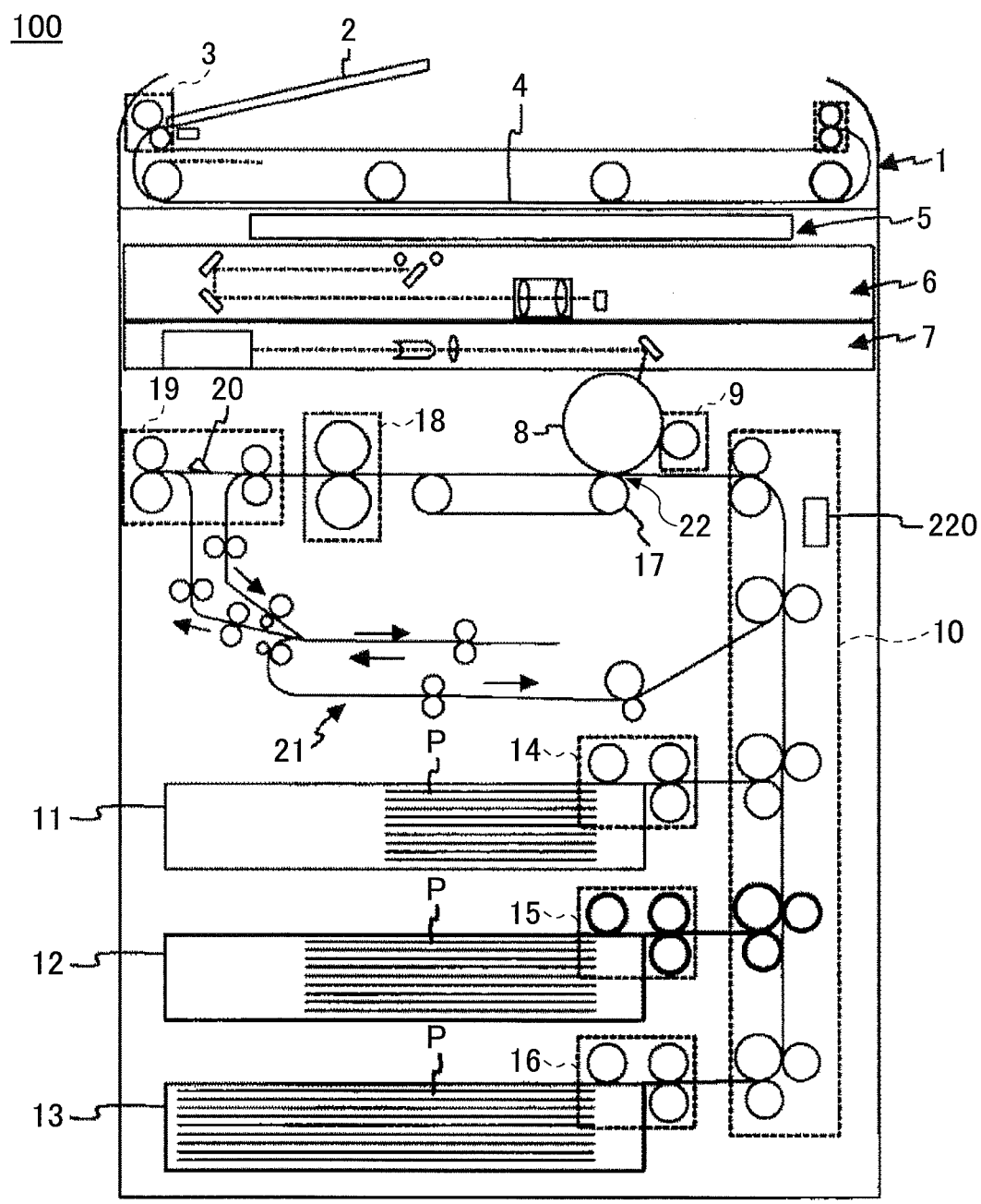
FIG. 1 is a diagram illustrating an example of a configuration of an image forming apparatus according to a first embodiment.

In the following, embodiments of the present invention will be described with reference to the accompanying drawings. In the drawings, the same reference numeral is assigned to the same component, and duplicate explanation may be omitted.

First Embodiment

Configuration of Image Forming Apparatus

FIG. 1 is a diagram illustrating an example of a configuration of an image forming apparatus 100 according to the first embodiment.

In an upper part of the image forming apparatus 100 an automatic document feeder (ADF) 1 including a document table 2 is provided. The upper part of the image forming apparatus 100 further includes a feeding roller 3, a feeding belt 4 and a contact glass 5. Upon a print key (not shown) being depressed, a document bundle (not shown) placed on the document table 2, is fed to a predetermined position on the contact glass 5 by the feeding roller 3 and the feeding belt 4 in order from the undermost document.

The image forming apparatus 100 further includes below the ADF 1, a readout unit 6, a writing unit 7, a photoconductor 8 and a developing unit 9. The readout unit 6 reads out the document fed onto the contact glass 5 and acquires image data. Based on the image data acquired by the readout unit 6, the writing unit 7 emits laser light on a surface of the photoconductor 8, and thereby forms an electrostatic latent image. Based on the electrostatic latent image formed on the surface of the photoconductor 8, a toner image is formed by the developing unit 9.

The image forming apparatus 100 further includes a transfer unit 17 below the photoconductor 8, and an image formation unit 22 between the photoconductor 8 and the transfer unit 17. The lower part of the image forming apparatus 100 further includes paper trays 11, 12 and 13, paper feeding devices 14, 15 and 16, and a conveyance unit 10. Papers P (conveyance objects) stored in the paper trays 11, 12 and 13 are fed by the paper feeding devices 14, 15 and 16, respectively, and conveyed by the conveyance unit 10. The toner image formed on the surface of the photoconductor 8 is transferred onto the paper P by the image formation unit 22.

The image forming apparatus 100 further includes a fixing unit 18 and a paper ejection unit 19. The paper P, on which the toner image is transferred, is conveyed to the fixing unit 18. The paper P is heated and pressed, and thereby the toner image is fixed on a surface of the paper P. The paper P passed through the fixing unit 18 is ejected to the outside of the image forming apparatus 100 by the paper ejection unit 19.

The image forming apparatus 100 further includes a bifurcating claw 20 and a double-side paper feeding conveyance unit 21. In the case of performing double-sided printing, the paper P passed through the fixing unit 18 is stacked in the double-side paper feeding conveyance unit 21 by switching the conveyance path at the bifurcating claw 20. The paper P stacked in the double-side paper feeding conveyance unit 21 is reversed and conveyed toward the photoconductor 8 again. After another toner image is formed on a back side, the paper P is ejected to the outside of the image forming apparatus 100.

The image forming apparatus 100 according to the present embodiment is provided with an end position detection device including a contact image sensor (CIS) 220 arranged on the conveyance path of the paper P. An image formation position is adjusted corresponding to a conveyance position of the paper P, and thereby a shift in image position on the paper P is prevented.

<Configuration of End Position Detection Device>

Next, a configuration of the end position detection device 200 provided in the image forming apparatus 100 will be explained.

Figure 2:
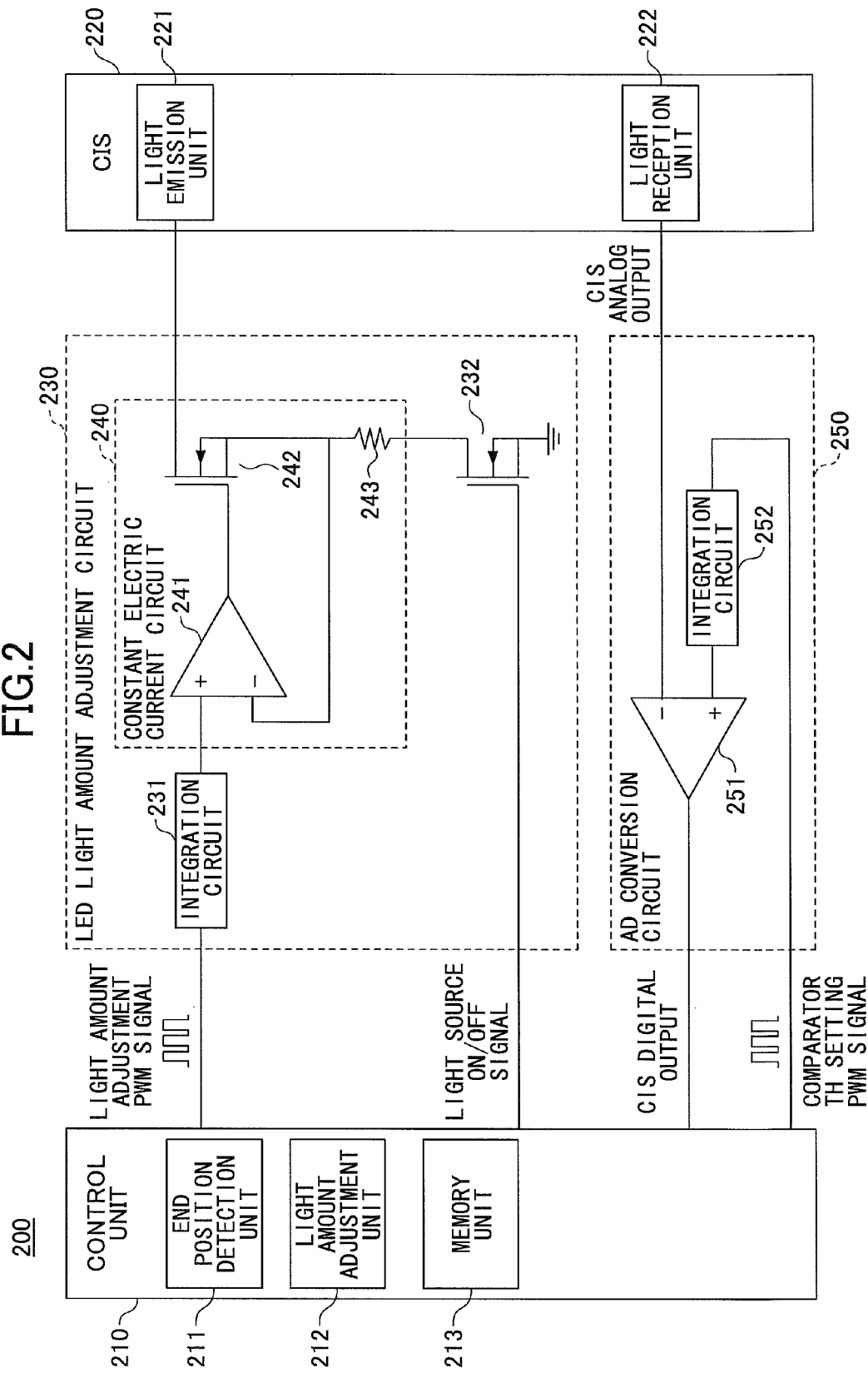
FIG. 2 is a diagram illustrating an example of a configuration of an end position detection device according to the first embodiment.

FIG. 2 is a diagram illustrating an example of the configuration of the end position detection device 200 according to the first embodiment.

The end position detection device 200 includes, as shown in FIG. 2, a control unit 210, a CIS 220, an LED (light-emitting diode) light amount adjustment circuit 230 and an AD (analog to digital) conversion circuit 250.

The control unit 210 includes an end position detection unit 211, a light amount adjustment unit 212 and a storage unit 213 (memory unit). The control unit 210 includes, for example, a CPU (central processing unit), a ROM (read-only memory), a RAM (random access memory) and the like. Functions of the respective units are realized by executing a control program, which is stored in the ROM or the like and loaded on a main memory, at the CPU.

The end position detection unit 211 detects an end position of a paper P in a width direction perpendicular to a conveyance direction based on an output from the CIS 220. The light amount adjustment unit 212 adjusts a light amount of a light source provided in a light emission unit 221 of the CIS 220. The storage unit 213 is, for example, a ROM, a RAM, an HDD (hard disk drive) or the like, and stores various setting values or the like.

Figure 3:
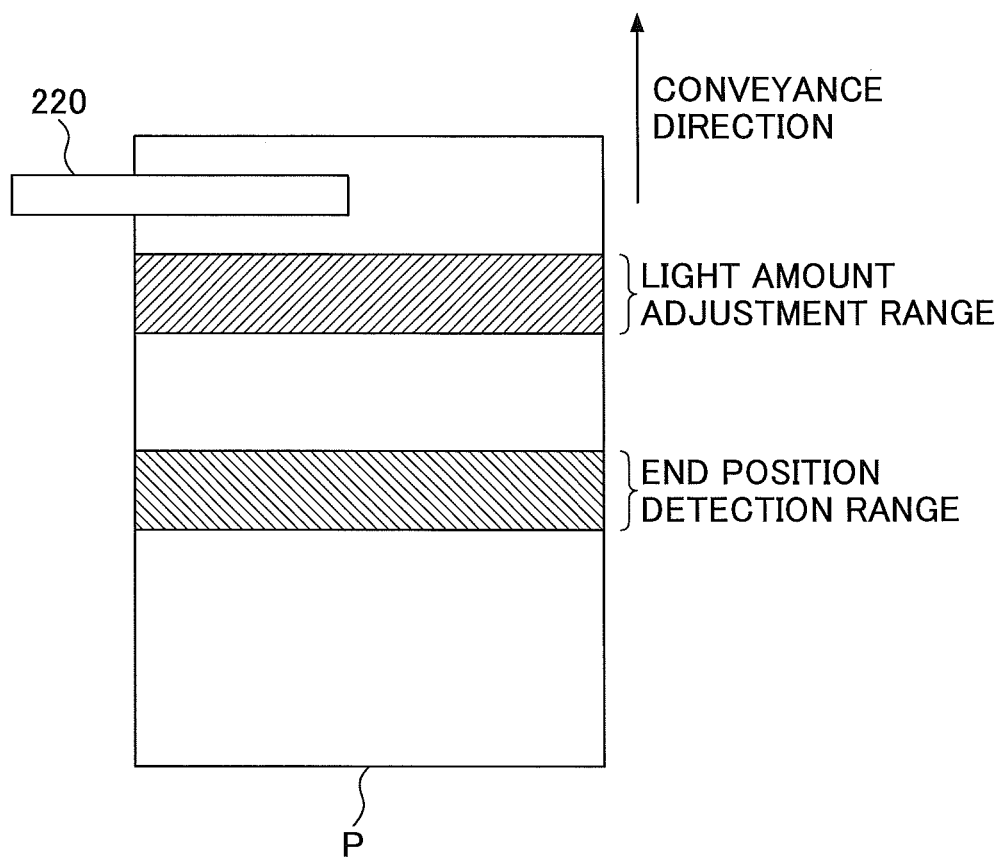
FIG. 3 is a diagram illustrating an example of a positional relationship between a paper and a contact image sensor (CIS) according to the first embodiment.

The CIS 220 includes the light emission unit 221 and a light reception unit 222, and is provided on the conveyance path of the paper P in the image forming apparatus 100. The CIS 220 is provided on the conveyance path of the paper P between the paper trays 11, 12 and 13 and the image formation unit 22, at which a toner image is formed on the paper P. Moreover, the CIS is provided so as to cross an end in the width direction of the conveyed paper P, as shown in FIG. 3.

Figure 10:
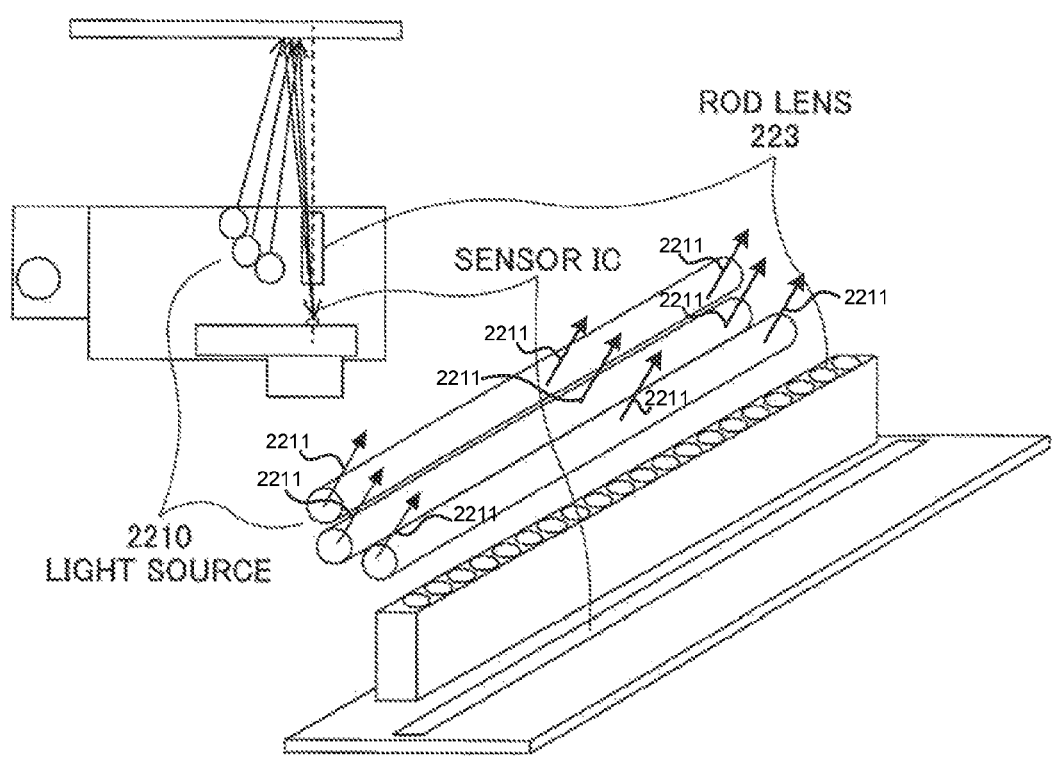
FIG. 10 is a diagram illustrating an example of a schematic configuration of a contact image sensor (CIS) according to the first embodiment.

FIG. 10 is a diagram illustrating a schematic configuration of the CIS 220. The CIS 220 is provided with the light emission unit 221, which includes light sources 2210 for the respective colors of RGB, a rod lens 223, which guides reflected light from the conveyed paper P, and the light reception unit 222. The light emission unit 221 of the CIS 220 includes plural light sources 2210 for the respective colors of RGB. Each light source 2210 of one color of RGB includes plural light emission elements 2211 of the color of RGB which are arranged in the width direction. Each of the light sources 2210 of the colors of RGB emits line-like light which is long in the width direction to a region through which the end in the width direction of the conveyed paper P passes. The light emission unit 221 emits light having wide range of wavelengths, for example, close to white light, in which lights of the respective colors of RGB are mixed by lighting the light sources 2210 of the respective colors of RGB simultaneously. The light source 2210 of the light emission unit 221 is, for example, an LED array in which plural red LEDs, green LEDs or blue LEDs are arranged in the width direction. However, the configuration of the light source 2210 of the light emission unit 221 may be different from the above-described configuration, as long as light emission elements 2211 of the respective colors of RGB are included. For example, each of the light sources 2210 of the respective colors of RGB may be configured by including a single element, such as a fluorescent tube, emitting line-like light which is long in the width direction.

The light reception unit 222 of the CIS 220 includes plural pixels (light reception elements) arranged in the width direction. Each of the pixels in the light reception unit 222 is a photoelectric conversion element that receives a reflected light of the light emitted by simultaneously lighting the light sources of the respective colors of RGB of the light emission unit 221, converts an optical signal into an electric signal, and outputs the electric signal corresponding to a received amount of light.

The LED light amount adjustment circuit 230 includes an integration circuit 231, a constant electric current circuit 240 and field-effect transistors (FET) 232 and 242. The LED light amount adjustment circuit 230 supplies a constant electric current to the light source of the light emission unit 221 in the CIS 220 to cause the light source to emit light with a predetermined light amount.

The integration circuit 231 generates a command voltage based on a light amount adjustment PWM (pulse width modulation) signal output from the light amount adjustment unit 212 of the control unit 210, and outputs the command voltage to the constant electric current circuit 240. In the constant electric current circuit 240, an operational amplifier 241 operates so that a voltage input to an input terminal (−) is equal to the command voltage, and a potential difference between both ends of a resister 243 becomes the same as the command voltage, and thereby a constant electric current having a value of the command voltage divided by the resistance value of the resistor 243 is output to the CIS 220.

The light amount adjustment unit 212 in the control unit 210 adjusts a light amount of emitted light from the light emission unit 221 of the CIS 220 by changing a pulse width of the light amount adjustment PWM signal to be output to the LED light amount adjustment circuit 230.

Meanwhile, the LED light amount adjustment circuit 230 may be provided for each of the colors of RGB of the light source of the light emission unit 221 in the CIS 220. The light amount adjustment unit 212 in the control unit 210 can adjust the light amount for each of the colors of RGB of the light source.

Moreover, the LED light amount adjustment circuit 230 turns on/off the light source of the light emission unit 221 in the CIS 220, by operations of the FETs 232 and 242 based on a light source ON/OFF signal sent from the end position detection unit 211 in the control unit 210.

The AD conversion circuit 250 includes a comparator 251 and an integration circuit 252, and binarizes an analog output from each of the pixels in the light reception unit 222 of the CIS 220. The integration circuit 252 generates a voltage based on a comparator TH setting PWM signal output from the end position detection unit 211 of the control unit 210, and outputs the voltage to the comparator 251.

The comparator 251 binarizes an analog output from each of the pixels in the light reception unit 222 of the CIS 220 based on a threshold set according to the voltage output from the integration circuit 252. The end position detection unit 211 of the control unit 210 can set the threshold for the comparator 251 to an arbitrary value by adjusting a pulse width of the comparator TH setting PWM signal.

The end position detection device 200 has the above-described configuration. The end position detection unit 211 of the control unit 210 detects an end position in the width direction of a paper P based on digital outputs from the CIS 220, which are binarized by the comparator 251.

(Detection of End Position)

Figure 4:
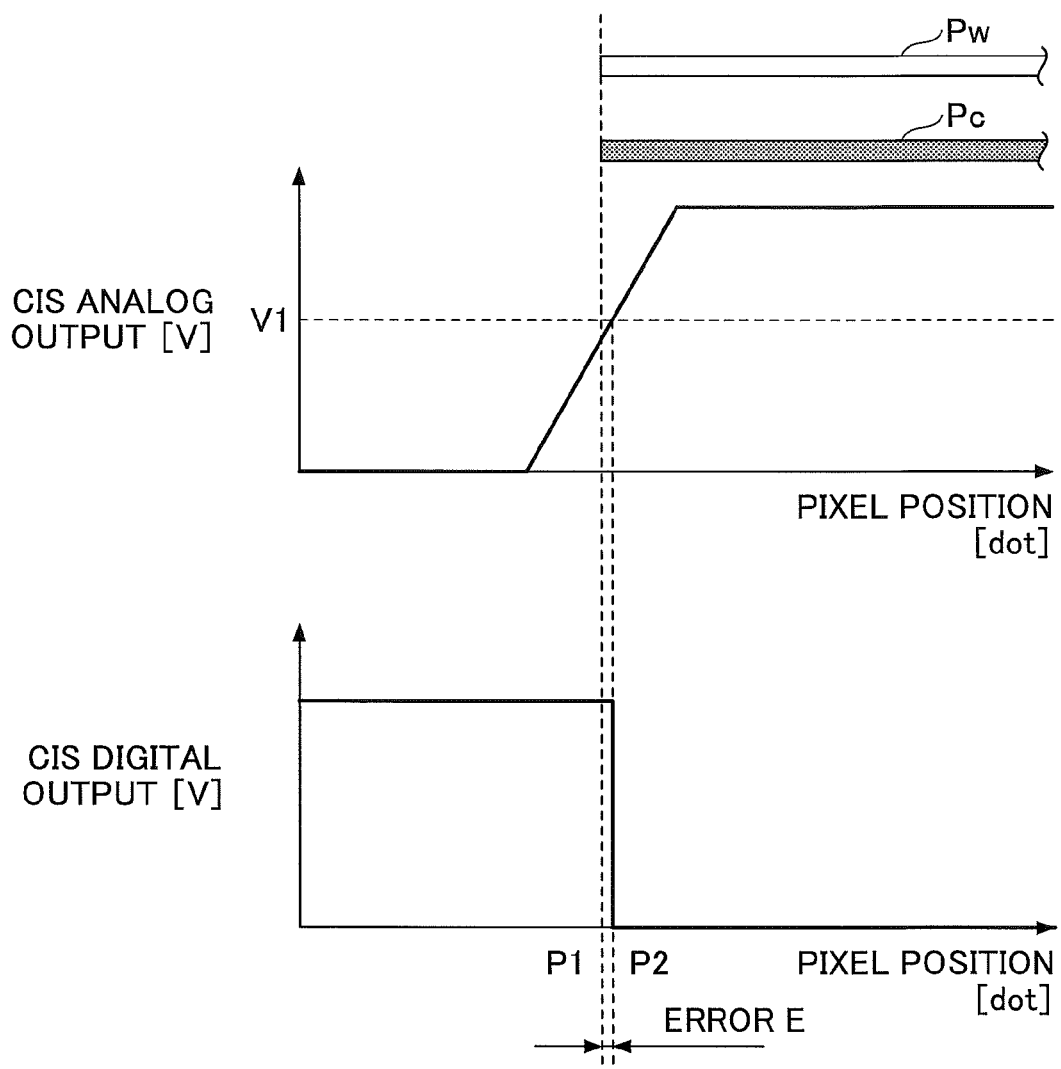
FIG. 4 is a diagram illustrating an example of a result of detection of an end position of a paper based on an output from the CIS according to the first embodiment.

FIG. 4 is a diagram illustrating an example of a result of detection of an end position of a paper according to the first embodiment. The upper part of FIG. 4 is a diagram illustrating an example of analog outputs from the respective pixels in the light reception unit 222 of the CIS 220. Moreover, the lower part of FIG. 4 is a diagram illustrating an example of digital outputs obtained by binarizing the analog outputs from the CIS 220 and the result of detection of the end position.

In the analog outputs from the CIS 220, as shown in the upper part of FIG. 4, an output value from a pixel corresponding to a position where the paper P does not exist is small since a reception amount of light is small, whereas an output value from a pixel corresponding to a position where the paper P exists is great since a reception amount of light is great. Moreover, the output value of the light reception unit 222 has a slope where the output value gradually varies in the vicinity of the end of the paper P due to an influence of scattering of light emitted from the light emission unit 221 of the CIS 220 at the end of the paper P.

The analog outputs from the CIS 220 are binarized, as shown in the lower part of FIG. 4, by the comparator 251 so that an analog output less than a threshold V1 is "High" and an analog output greater than or equal to the threshold V1 is "Low". Meanwhile, the comparator 251 in the AD conversion circuit 250 may binarize the analog output from the CIS 220 so that an analog output less than the threshold V1 is "Low" and an analog output greater than or equal to the threshold V1 is "High".

The end position detection unit 211 of the control unit 210 detects a pixel position where the CIS digital output, binarized as above, changes from "High" to "Low", as the end position in the width direction of the paper P.

In the end position detection device 200, the light sources of the respective colors of RGB in the light emission unit 221 of the CIS 220 are lighted simultaneously, and light having a wide range of wavelengths, in which lights of the respective colors of RGB are mixed, is emitted to the paper P. Even when a colored paper Pc is used for the paper P and light of a part of the range of wavelengths is absorbed by the colored paper Pc, the respective pixels in the light reception unit 222 receive reflected light with sufficient intensity since light of other parts of the range of wavelengths is reflected by the colored paper Pc. Therefore, as shown in the upper part of FIG. 4, even in the case where the paper P is a white paper Pw or a colored paper Pc, analog signals of the same degree are output.

Accordingly, in the end position detection unit 211, as shown in the lower part of FIG. 4, irrespective of a kind of (a type of) the paper P (white paper Pw, colored paper Pc or the like), an error E between the actual end position P1 of the paper P and the detected end position P2 of the paper P is reduced, and the end position of the paper P can be obtained with a high degree of accuracy.

Meanwhile, the end position detection unit 211 may perform plural times the end position detection at different positions of the paper P in the conveyance direction, and obtain an averaged position as the end position of the paper P.

<Adjust Light Amount>

Next, a method of adjusting light amounts of the respective light sources in the light emission unit 221 of the CIS 220 by the light amount adjustment unit 212 of the control unit 210 will be explained.

The adjustment of light amount by the light amount adjustment unit 212 is performed, as shown in FIG. 3, in a light amount adjustment range which is on the front side in the conveyance direction of the end position detection range where the end position of the paper P is detected. Since the end position detection unit 211 performs the detection of the end position after the light amounts of the respective light sources in the light emission unit 221 of the CIS 220 are adjusted, the end position of the paper P can be detected with a higher degree of accuracy.

Figure 5:
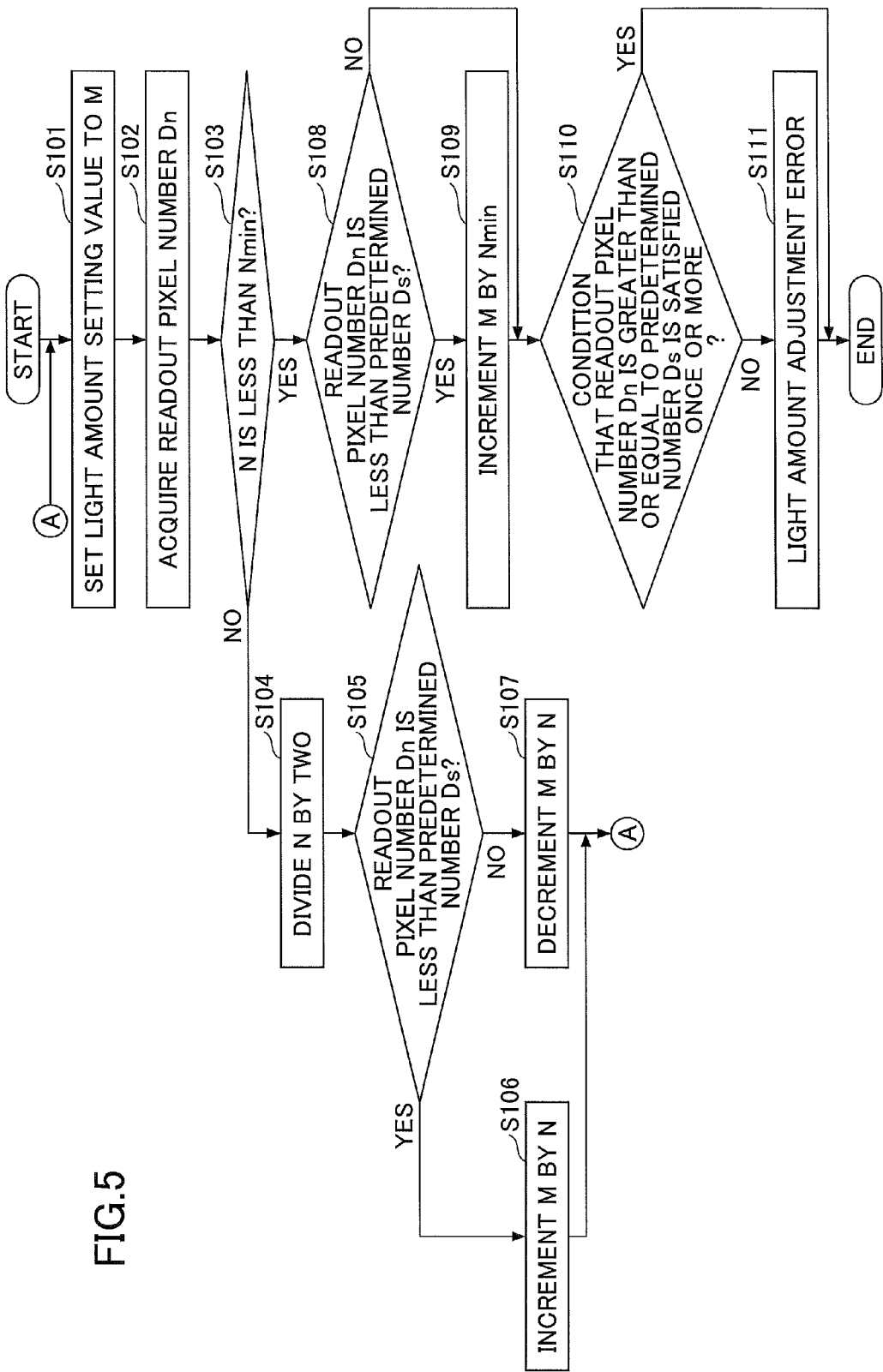
FIG. 5 is a flowchart illustrating an example of light amount adjustment processing according to the first embodiment.

FIG. 5 is a flowchart illustrating an example of light amount adjustment processing according to the first embodiment.

At first, the light amount adjustment unit 212 of the control unit 210 sets a light amount setting value for a light source in the light emission unit 221 of the CIS 220 to M [in mA] (step S101). The light amount adjustment unit 212 adjusts a light amount of the light source by setting an electric current value to be output from the constant electric current circuit 240. A default value is set as the light amount setting value M in advance, and the value will be adjusted in a process at step S102 or later.

Next, a light source in the light reception unit 222 of the CIS 220 emits light with the light amount, set as above, and the end position detection unit 211 of the control unit 210 acquires a number of pixels in the light reception unit 222 of the CIS 220 corresponding to a region where the paper P exists (in the present embodiment, a number of pixels, digital outputs from the CIS 220 of which are "Low") as a readout pixel number Dn (step S102).

Next, the light amount adjustment unit 21 compares a light amount adjustment amount N [in mA] with a minimum adjustment amount Nmin [in mA] (step S103). The light amount adjustment amount N and the minimum adjustment amount Nmin are set in advance to predetermined values, respectively. The light amount adjustment amount N is set to be a predetermined value greater than the minimum adjustment amount Nmin as a default value in advance. The light amount adjustment amount N is set to be a value less than the default value in stages at step S104 or later.

In the case where the light amount adjustment amount N is greater than or equal to the minimum adjustment amount Nmin (step S103: NO), the light amount adjustment unit 212 replaces the light amount adjustment amount N by a value of N divided by two (i.e. N/2) (step S104). Meanwhile, though in the present embodiment, the light amount adjustment amount N is divided by two at step S104, the present invention is not limited to a half. The light amount adjustment amount N may be set to any value as long as the light amount adjustment amount N is reduced.

Next, the light amount adjustment unit 212 compares the readout pixel number Dn acquired at step S102 with a predetermined number Ds which is set in advance (step S105). The predetermined number Ds is a value determined based on a design value for a conveyance position of the paper P on the conveyance path. The light amount adjustment unit 212 compares the readout pixel number Dn with the predetermined value Ds, and adjusts a light amount of the light emission unit 221 of the CIS 220.

In the case where the readout pixel number Dn is less than the predetermined number Ds (Step S105: YES), reflected light from the paper P can be insufficient since the light amount is small. Then, in this case, the light amount adjustment unit 212 replaces the light amount setting value M by a value greater than M by N (i.e. M+N) so as to increase the light amount of the light source (step S106).

Moreover, in the case where the readout pixel number Dn is greater than or equal to the predetermined number Ds (step S105: NO), the reflected light from the paper P can be great more than necessary since the light amount is great. Then, in this case, the light amount adjustment unit 212 replaces the light amount setting value M by a value less than M by N (i.e. M−N) so as to reduce the light amount of the light source (step S107). Upon the light amount adjustment unit 212 resetting the light amount setting value M at step S106 or step S107, the process returns to step S101.

In the case where the light amount adjustment amount N is less than the minimum adjustment amount Nmin (step S103: YES), the light amount adjustment unit 212 compares the readout pixel number Dn acquired at step S102 with the predetermined number Ds which is set in advance (step S108).

In the case where the readout pixel number Dn is less than the predetermined number Ds (step S108: YES), the light amount adjustment unit 212 replaces the light amount setting value M by a value greater than M by Nmin (i.e. M+Nmin) (step S109).

Next, it is determined whether the light amount adjustment unit 212 satisfies once or more the condition that the readout pixel number is greater than or equal to the predetermined number Ds (i.e. Dn>=Ds) at step S105 or step S108 (step S110). In the case where the light amount adjustment unit 212 satisfies the condition Dn>=Ds once or more (step S110: YES), the light amount setting value M is fixed and the process ends.

Moreover, in the case where the light amount adjustment unit 212 never satisfies the condition Dn>=Ds (step S110: NO), the light amount can be set to an inappropriate value, and the process ends by reporting that it is a light amount adjustment error (step S111).

The light amount adjustment processing, as described above, may be performed for the light sources of the respective colors of RGB provided in the light emission unit 221 of the CIS 220 collectively, or may be performed for the light source of each color individually.

The light amount adjustment unit 212 of the control unit 210 optimizes the light amount of the light emission unit 221 of the CIS 220 according to the light amount adjustment processing, as described above. The end position detection unit 211 can obtain the end position of the paper with a higher degree of accuracy by detecting the end position in the state where the light amount of the light emission unit 221 is optimized.

As described above, according to the end position detection device 200 of the first embodiment, the light emission unit 221 of the CIS 220 is provided with light sources of the respective colors of RGB, and emits light having a wide range of wavelengths, and thereby end positions of a variety of papers P, which are different in color or the like, can be detected with a high degree of accuracy.

Moreover, according to the image forming apparatus 100 provided with the end position detection device 200, an image formation position can be adjusted based on the detection result for the end position of the paper P, and thereby an image of high quality, free from a defect such as a shift in an image position, can be provided.

Meanwhile, in the present embodiment, the following perception is possible. That is, an end position detection device 200 according to the present embodiment includes a CIS 220 including a light emission unit 221 in which plural light sources of colors of RGB are arranged in a width direction, respectively, and a light reception unit 222 in which plural pixels that output signals corresponding to received amounts of light are arranged in the width direction; and an end position detection unit 211 which detects an end position in the width direction of a paper P based on outputs from the light reception unit 222 upon the light sources of the respective colors of RGB being lighted simultaneously and emitting light to the paper P.

Moreover, the end position detection device 200 according to the present embodiment further includes a light amount adjustment unit 212 which performs light amount adjustment for the light emission unit 211 based on a readout pixel number Dn from one end of the light reception unit 222 to a pixel corresponding to the end position of the paper P.

Moreover, in the end position detection device 200, as described above, the light amount adjustment unit 212 increases the light amount of the light emission unit 221 by a light amount adjustment amount N in the case where the readout pixel number Dn is less than a predetermined number Ds, and decreases the light amount of the light emission unit 221 by the light amount adjustment amount N in the case where the readout pixel number Dn is greater than or equal to the predetermined number Ds.

Moreover, in the end position detection device 200, as described above, the light amount adjustment unit 212, while reducing the light amount adjustment amount N with each light amount adjustment, performs the light amount adjustment repeatedly until the light amount adjustment amount N becomes less than a minimum adjustment amount Nmin.

Moreover, the image forming apparatus 100 according to the present embodiment includes the end position detection device 200, as described above.

Moreover, in the image forming apparatus 100, as described above, the CIS 220 is provided on a conveyance path of a paper P between paper trays 11, 12 and 13 which store the paper P and an image formation unit 22.

Moreover, the end position detection method according to the present embodiment is a method, in an end position detection device 200 including a CIS 220 including a light emission unit 221 in which plural light sources of colors of RGB are arranged in a width direction orthogonal to a conveyance direction of a paper P, respectively, and a light reception unit 222 in which plural pixels that output signals corresponding to received amounts of light are arranged in the width direction, for detecting an end position in the width direction of the paper P, including a readout step for the light sources of the colors of RGB, respectively, being lighted simultaneously and emitting light to the paper P, for the light reception unit 222 receiving reflected light and outputting signals corresponding to received amounts of light for every plural pixels; and a detection step for detecting the end position in the width direction of the paper P based on the output from the light reception unit 222.

Second Embodiment

Next, a second embodiment will be explained. Meanwhile, an explanation for the same component as in the first embodiment will be omitted.

In an end position detection device 200 according to the second embodiment, light amount adjustment processing at the light emission unit 221 of the CIS 220 by the light amount adjustment unit 212 is different from that in the first embodiment.

Figures 6, 7:
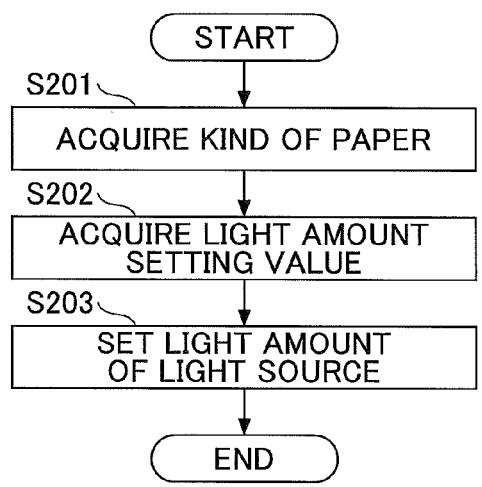
FIG. 6 is a flowchart illustrating an example of light amount adjustment processing according to a second embodiment.
FIG. 7 is a diagram illustrating an example of a light amount setting value table according to the second embodiment.

FIG. 6 is a flowchart illustrating an example of the light amount adjustment processing according to the second embodiment.

In the light amount adjustment processing according to the second embodiment, at first, the light amount adjustment unit 212 acquires a kind of (a type of) paper for the conveyed paper P (step S201). The light amount adjustment unit 212 acquires a kind of (a type of) paper set preliminarily by a user for each of the paper trays 11, 12 and 13 in the image forming apparatus 100. Or, the light amount adjustment unit 212 may acquire a kind of paper detected by a paper kind sensor provided on an upstream side of the CIS 220 on a conveyance path, for example.

Next, the light amount adjustment unit 212 acquires a light amount setting value for a light source for each color of RGB provided in the light emission unit 221 of the CIS 220 from a storage unit 213 of a control unit 210 (step S202). The light amount setting value is preliminarily set for the light source for each color of RGB for each paper kind of the paper P (corresponding to the property of the paper P), and a light amount setting value table exemplified in FIG. 7 is stored in the storage unit 213.

Next, the light amount adjustment unit 212 sets a light amount of the light source for each color of RGB in the light emission unit 221 of the CIS 220 to the light amount corresponding to the property of the paper P (the paper kind of the paper P) which is acquired from the storage unit 213 (step S203), and the process ends.

As described above, in the end position detection device 200 according to the second embodiment, the amount of the light source for each color of RGB provided in the light emission unit 221 of the CIS 220 is optimized according to simple processing by the light amount adjustment unit 212. According to the light amount of the light emission unit 221 of the CIS 220, optimized as above, the end position in the width direction of the paper P can be detected with high accuracy.

Meanwhile, in the present embodiment, the following perception is possible. That is, an end position detection device 200 according to the present embodiment includes a CIS 220 including a light emission unit 221 in which plural light sources of colors of RGB are arranged in a width direction, respectively, and a light reception unit 222 in which plural pixels that output signals corresponding to received amounts of light, upon the light sources of the respective colors of RGB being lighted simultaneously and emitting light to a paper P, are arranged in the width direction; and an end position detection unit 211 which detects an end position in the width direction of the paper P based on outputs from the light reception unit 222.

Moreover, the end position detection device 200 according to the present embodiment further includes a light amount adjustment unit 212 which performs light amount adjustment for the light emission unit 211 based on a readout pixel number Dn from one end of the light reception unit 222 to a pixel corresponding to the end position of the paper P.

Moreover, the end position detection device 200 according to the present embodiment further includes a storage unit 213 that stores a light amount determined for the light source for each color of RGB corresponding to a kind of the paper P, and a light amount adjusting unit 212 that acquires the light amount corresponding to the kind of the paper P from the storage unit 213 and adjusts the light amount of the light emission unit 221.

Comparative Example

A result of detection of an end position of a paper in an image forming apparatus, in which the end position in a width direction of the paper is detected based on an output from a contact image sensor (CIS) having a detection region which is arranged on a conveyance path so as to include the end in the width direction of the paper, will be illustrated.

Figure 8:
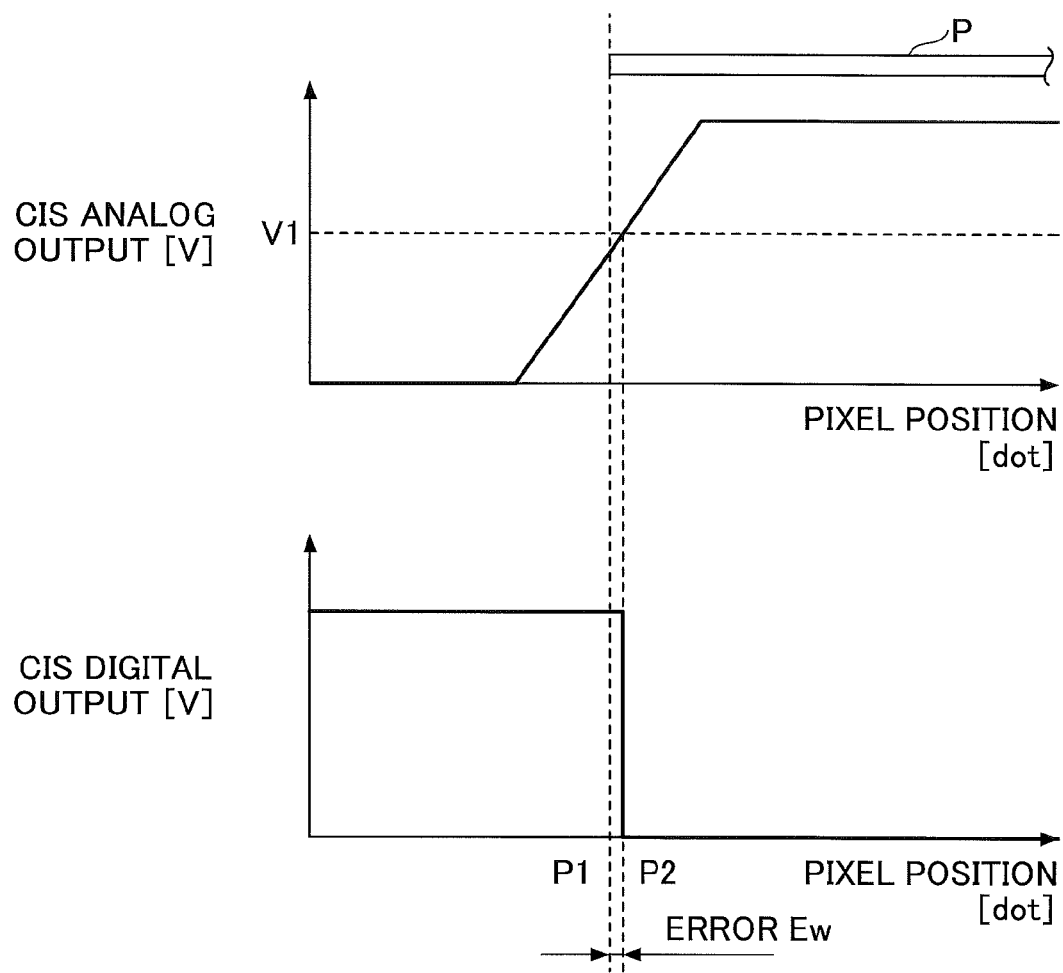
FIG. 8 is a diagram illustrating an example of a result of detecting an end position of a white paper according to a comparative example.

The upper part of FIG. 8 illustrates, in the comparative example, analog outputs from respective pixels in the CIS when a paper P passes through the detection region. An output value from a pixel corresponding to a position where the paper P exists is great, and an output value from a pixel corresponding to a position where the paper P does not exist is small.

The analog outputs from the CIS are binarized by a comparator, for example, as shown in the lower part of FIG. 8, such that the output value less than a threshold V1 is "High" and the output value greater than or equal to the threshold V1 is "Low". In digital outputs of the CIS, binarized as above, a pixel position where the output value changes from "High" to "Low" is detected as an end position in the width direction of the paper P.

Figure 9:
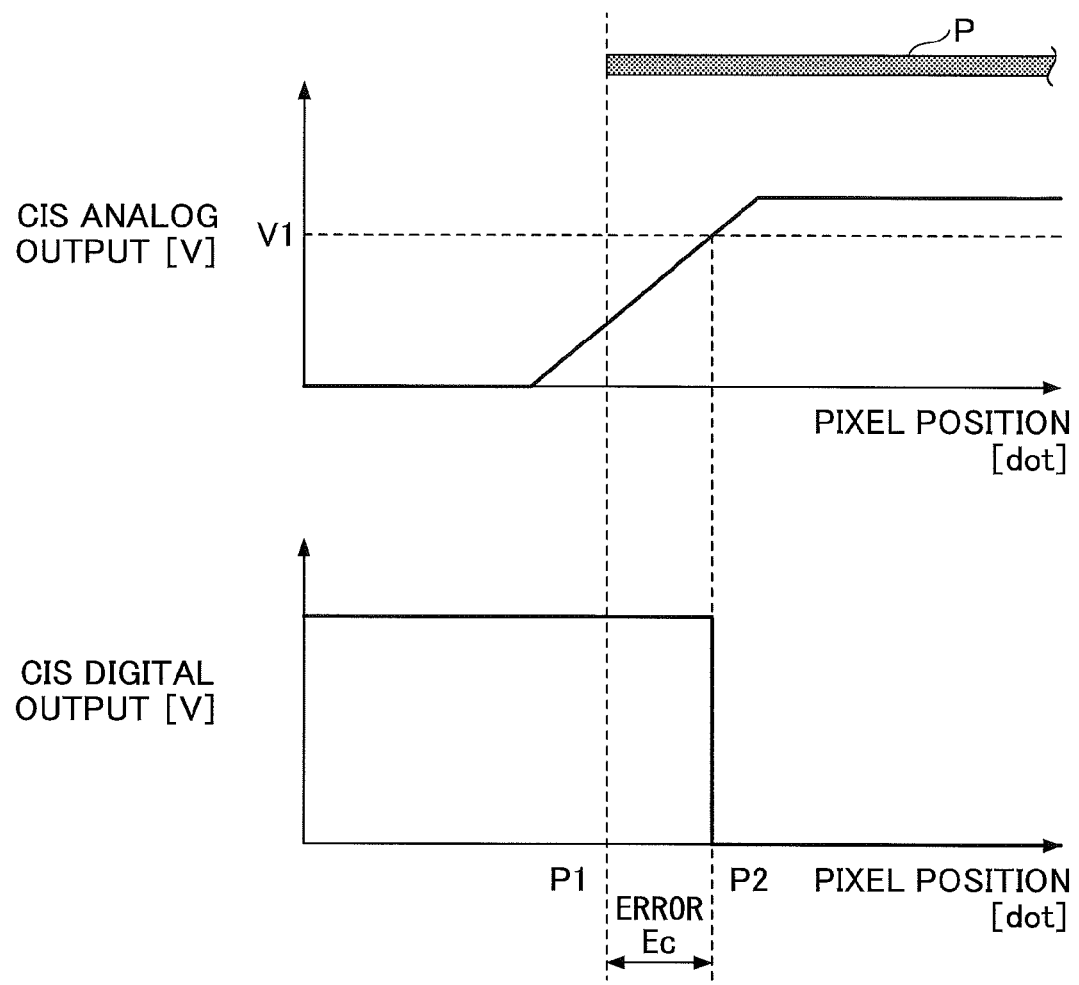
FIG. 9 is a diagram illustrating an example of a result of detecting an end position of a colored paper according to the comparative example.

Here, in the case of the CIS which emits monochromatic light such as green, for example, when a colored paper such as black or deep blue is used for a paper P, the light is absorbed by the paper P and it may be difficult to detect sufficient reflected light, and the analog output value from the CIS may be lowered, as shown in the upper part of FIG. 9.

Moreover, the analog output from the CIS has a slope where the output value gradually varies in the vicinity of the end of the paper P due to an influence of scattering of light emitted from the CIS at the end of the paper P. Especially, in the case of a colored paper used for the paper P (upper part of FIG. 9), compared with the case of the white paper (upper part of FIG. 8), the slope of the analog output from the CIS in the vicinity of the end of the paper P is small, and a pixel position where the output value exceeds the threshold V1 may be shifted inward of the paper P.

In this way, in the case of detecting an end position of a colored paper using a CIS according to the comparative example which emits monochromatic light, an error Ec between an actual end position P1 and a detected end position P2 (See the lower part of FIG. 9) may be greater than the error Ew in the case of the white paper used for the paper P (lower part of FIG. 8).

Further, the present invention is not limited to these embodiments, but various variations and modifications may be made without departing from the scope of the present invention.

What is claimed is:

1. A side edge detection device with a multicolored light detection unit, comprising:
   a light emission unit including a plurality of light sources for a plurality of colors, respectively, a light source for each of the colors including a plurality of light-emitting elements being arranged in a width direction to a conveyance object and configured to emit line-like light of color which is long in the width direction to the conveyance object, the width direction being orthogonal to a conveyance direction of the conveyance object, the light sources for at least two of the colors simultaneously emitting light to the conveyance object; and
   a detection unit configured to detect a side edge in the width direction of the conveyance object based on signals output from light reception elements in the multicolored light detection unit, wherein
   the multicolored light detection unit includes a plurality of light reception elements, each configured to receive reflected light from the conveyance object, the reflected light including respective line-like light of the plurality of colors emitted from the plurality of light sources for the colors which simultaneously emit light to the conveyance object and output a signal corresponding to a received amount of light, the light reception elements being arranged in an array in the width direction.

2. The side edge detection device as claimed in claim 1, further comprising a light amount control unit configured to control an amount of the light emitted from each of the light sources based on a number of readout light reception elements from a light reception element closest to an end of the multicolored light detection unit to a light reception element at a position corresponding to the side edge in the width direction of the conveyance object in the array.

3. The side edge detection device as claimed in claim 2, wherein the light amount control unit increases the amount of the light emitted from each of the light sources by an adjustment amount in a case where the number of the readout light reception elements is less than a predetermined number, and decreases the amount of the light emitted from each of the light sources by the adjustment amount in a case where the number of the readout light reception elements is greater than or equal to the predetermined number.

4. The side edge detection device as claimed in claim 3, wherein the light amount control unit reduces the adjustment amount each time the amount of the light emitted from the light source is controlled, and controls repeatedly the amount of the light emitted from each of the light sources until the adjustment amount becomes less than a predetermined value.

5. The side edge detection device as claimed in claim 1, further comprising:
   a memory unit configured to store a value of an amount of the light emitted from each of the light sources determined for each of the colors corresponding to a property of the conveyance object; and
   a light amount control unit configured to acquire the value of the amount of the light emitted from each of the light sources corresponding to the property of the conveyance object from the memory unit and control the amount of the light emitted from each of the light sources for each of the colors.

6. An image forming apparatus comprising the side edge detection device as claimed in claim 1.

7. The image forming apparatus as claimed in claim 6, wherein the light emission unit and the multicolored light detection unit are provided on a conveyance path of the conveyance object and between a storage unit configured to store the conveyance object and an image formation unit configured to form an image on the conveyance object.

8. A side edge detection method using a multicolored light detection unit, comprising:
   emitting line-like light of a plurality of colors to a conveyance object from a plurality of light sources for the plurality of colors, respectively, a light source for each of the colors including a plurality of light-emitting elements being arranged in a width direction to a conveyance object and emitting the line-like light of color which is long in the width direction orthogonal to a conveyance direction of the conveyance object, the light sources for at least two of the colors simultaneously emitting light to the conveyance object;

receiving reflected light by the multicolored light detection unit from the conveyance, the reflected light including respective line-like light of the plurality of colors emitted from the plurality of light sources for the color which simultaneously emit light to the conveyance object;

outputting a signal corresponding to a received amount of light at each of a plurality of light reception elements, which are arranged in an array in the width direction; and detecting a side edge in the width direction of the conveyance object based on the signals output from the light reception elements.

9. A non-transitory computer-readable storage medium storing a program for causing a side edge detection device with a multicolored light detection unit to execute a process of detecting an end position of a conveyance object, the process comprising:

an emission step of emitting line-like light of a plurality of colors to the conveyance object from a plurality of light sources for the plurality of colors, respectively, a light source for each of the colors including a plurality of light-emitting elements being arranged in a width direction to a conveyance object and emitting the line-like light of color which is long in the width direction orthogonal to a conveyance direction of the conveyance object, the light sources for at least two of the colors simultaneously emitting light to the conveyance object;

a reception step of receiving reflected light by the multicolored light detection unit from the conveyance object the reflected light including respective line-like light of the plurality of colors emitted from the plurality of light sources for the color which simultaneously emit light to the conveyance object;

an output step of outputting a signal corresponding to a received amount of light at each of a plurality of light reception elements, which are arranged in an array in the width direction; and a detection step of detecting the side edge in the width direction of the conveyance object based on the signals output from the light reception elements.

10. The side edge detection device as claimed in claim 1, further comprising:

a light amount control unit configured to output signal values to each of the light sources.

11. The side edge detection device as claimed in claim 1, further comprising:

a light amount control unit configured to control an amount of the light emitted from each of the light sources individually based on a signal value for each of the plurality of colors communicated to each of the light sources.

* * * * *